United States Patent
Tsaur et al.

(10) Patent No.: US 9,176,825 B2
(45) Date of Patent: Nov. 3, 2015

(54) GRANULAR APPLICATION DATA LIFECYCLE SOURCING FROM A SINGLE BACKUP

(75) Inventors: Ynn-Pyng A. Tsaur, Oviedo, FL (US); Douglas J. Fletcher, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 968 days.

(21) Appl. No.: 12/347,577

(22) Filed: Dec. 31, 2008

(65) Prior Publication Data

US 2010/0169594 A1    Jul. 1, 2010

(51) Int. Cl.
 *G06F 12/00*        (2006.01)
 *G06F 11/14*        (2006.01)

(52) U.S. Cl.
 CPC ........ *G06F 11/1451* (2013.01); *G06F 11/1456* (2013.01); *G06F 11/1461* (2013.01)

(58) Field of Classification Search
 CPC ............ G06F 11/1451; G06F 11/1461; G06F 11/1464; G06F 11/1456; G06F 11/1471; G06F 11/1458
 USPC .......................................... 711/162, E12.103
 See application file for complete search history.

(56) References Cited

U.S. PATENT DOCUMENTS

| | | | |
|---|---|---|---|
| 4,974,156 A * | 11/1990 | Harding et al. | 711/162 |
| 6,594,744 B1 * | 7/2003 | Humlicek et al. | 711/162 |
| 7,185,048 B2 * | 2/2007 | Arakawa et al. | 709/202 |
| 7,487,395 B2 | 2/2009 | van Ingen et al. | 714/16 |
| 7,529,785 B1 * | 5/2009 | Spertus et al. | 1/1 |
| 7,549,031 B2 | 6/2009 | Inagaki | 711/162 |
| 7,636,821 B2 * | 12/2009 | Griffin et al. | 711/162 |
| 7,802,134 B1 * | 9/2010 | Sobel et al. | 714/15 |
| 7,809,907 B2 * | 10/2010 | Uratani et al. | 711/162 |
| 2005/0149577 A1 | 7/2005 | Okada et al. | 707/200 |
| 2006/0230244 A1 | 10/2006 | Amarendran et al. | 711/162 |
| 2008/0208929 A1 * | 8/2008 | Phillipi | 707/204 |
| 2008/0209142 A1 | 8/2008 | Obernuefemann | 711/161 |

* cited by examiner

*Primary Examiner* — Mardochee Chery
(74) *Attorney, Agent, or Firm* — Campbell Stephenson LLP

(57) ABSTRACT

A system or method for granular application data lifecycle sourcing from a single backup is disclosed. In one embodiment of the method, a computer system periodically creates a primary backup copy of data stored on a storage system in order to create a plurality of primary backup copies. The computer system also periodically creates a secondary backup copy of data stored on the storage system in order to create a first plurality of secondary backup copies, wherein each of the secondary backup copies of the first plurality is created in part by copying data from a respective one of the primary backup copies. The periodicity of creating the primary backup copies, however, is distinct from the periodicity of creating the secondary backup copies of the first plurality.

24 Claims, 8 Drawing Sheets

FIG. 3

| Table Entry | Primary Schedule | Retention Period | Identity of Data To Be Copied During The Primary Backup Process |
|---|---|---|---|
| 1 | Daily at 1:00 AM | 4 Weeks | \\CS14\* |

| Table Entry | Secondary Schedule | Retention Period | Tape Library | Identity of Data To Be Copied During The Primary Backup Process |
|---|---|---|---|---|
| 1 | Monday at 2:00 AM | 7 years | 1 | \\CS14\Exchange\* |
| 2 | Sunday at 2:00 AM | 1 year | 2 | \\CS14\SQL\BackupExec\BEDB |
| 3 | Daily at 3:00 AM | 6 months | 1 | \\CS14\C:\DocumentsAndSettings\*.doc, \\CS14\C:\DocumentsAndSettings\*.ppt |

46

| Entry | Time Stamp | Retention Period | Copy Location | Identifier of Data 50 |
|---|---|---|---|---|
| 1507 | 7-28-08 1:00 AM | 4-weeks | \\A:\BEWS\B2D\BU728 | \\CS14\* |
| 1506 | 7-28-08 2:00 AM | 6-months | Lib1-Tape40-Offset=A11 | \\CS14\C:\DocumentsAndSettings\*.doc, \\CS14\C:\DocumentsAndSettings\*.ppt |
| 1505 | 7-27-08 1:00 AM | 4-weeks | \\A:\BEWS\B2D\BU727 | \\CS14\* |
| 1504 | 7-27-08 2:00 AM | 7-years | Lib1-Tape40-Offset=A10 | \\CS14\Exchange\* |
| 1503 | 7-27-08 3:00 AM | 6-months | Lib1-Tape40-Offset=A4 | \\CS14\C:\DocumentsAndSettings\*.doc, \\CS14\C:\DocumentsAndSettings\*.ppt |
| 1502 | 7-26-08 1:00 AM | 4-weeks | \\A:\BEWS\B2D\BU726 | \\CS14\* |
| 1501 | 7-26-08 2:00 AM | 1-year | Lib2-Tape20-Offset=A5 | \\CS14\SQL\BackupExec\BEDB |
| 1500 | 7-26-08 3:00 AM | 6-months | Lib1-Tape39-Offset=A3 | \\CS14\C:\DocumentsAndSettings\*.doc, \\CS14\C:\DocumentsAndSettings\*.ppt |
| ... | | | | |
| 1 | 5-2-03 3:00 AM | 7-years | Lib1-Tape1-Offset=A2 | \\CS14\Exchange\* |

*FIG. 6*

GRANULAR APPLICATION DATA LIFECYCLE SOURCING FROM A SINGLE BACKUP

BACKGROUND OF THE INVENTION

Businesses and other entities store data objects (e.g., image files, text files, databases, directories, etc.) on memory media such as hard disks. The present invention will be described with reference to files, it being understood that the term data object should not be limited thereto. Files, however, are subject to hardware failures, software errors, or human errors. Hardware failures can range from the failure of a single hard disk to the destruction of an entire data center, making some or all data objects unrecoverable. Software failures are bugs or procedural errors in, for example, an application that corrupts the contents of its data. User errors include errors such as inadvertent deletion or overwriting of files that are later required. These failures and errors has motivated the concept of creating backups of files on separate memory media (e.g. magnetic tapes).

Mirroring and replication technology can be configured to provide good protection against failures and errors. But these technologies will also write data corrupted by software or human errors every bit as reliably as they write correct data, and they faithfully record, for example, the file system or database metadata updates that result from a user's mistaken deletion of an important file on all mirrors or replicas. Because they are optimized to serve different purposes, mirroring and replication technologies have different goals than backup. Mirroring and replication attempt to preserve the bit-for-bit state of files as they change, while backup attempts to preserve the state of the files as of some past point-in-time at which the files were known to be consistent. Mirrors or replicas keep the contents of all replicated devices or files identical to each other. Backup however, does something quite different: it captures an image of files at an instant in the past, so that if need be, everything that has happened to the files since that instant can be forgotten, and the state of operations can be restored to that instant.

SUMMARY OF THE INVENTION

A system or method for granular application data lifecycle sourcing from a single backup is disclosed. In one embodiment of the method, a computer system periodically creates a primary backup copy of data stored on a storage system in order to create a plurality of primary backup copies. The computer system also periodically creates a secondary backup copy of data stored on the storage system in order to create a first plurality of secondary backup copies, wherein each of the secondary backup copies of the first plurality is created in part by copying data from a respective one of the primary backup copies. The periodicity of creating the primary backup copies, however, is distinct from the periodicity of creating the secondary backup copies of the first plurality. The computer system can also periodically create another secondary backup copy of data stored on the storage system in order to create a second plurality of secondary backup copies. Each of the secondary backup copies of the first plurality is created in part by copying data from a respective one of the primary backup copies. The periodicity of creating the primary backup copies is distinct from the periodicity of creating the secondary backup copies of the second plurality, and the periodicity of creating the secondary backup copies of the first plurality is distinct from the periodicity of creating the secondary backup copies of the second plurality.

BRIEF DESCRIPTION OF THE DRAWINGS

The present invention may be better understood, and its numerous objects, features, and advantages made apparent to those skilled in the art by referencing the accompanying drawings.

FIG. 3 illustrates a graphical representation of an example primary backup table.

FIG. 4 illustrates a graphical representation of an example secondary backup table.

FIG. 6 illustrates a graphical representation of an example backup catalog.

The use of the same reference symbols in different drawings indicates similar or identical items.

DETAILED DESCRIPTION

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
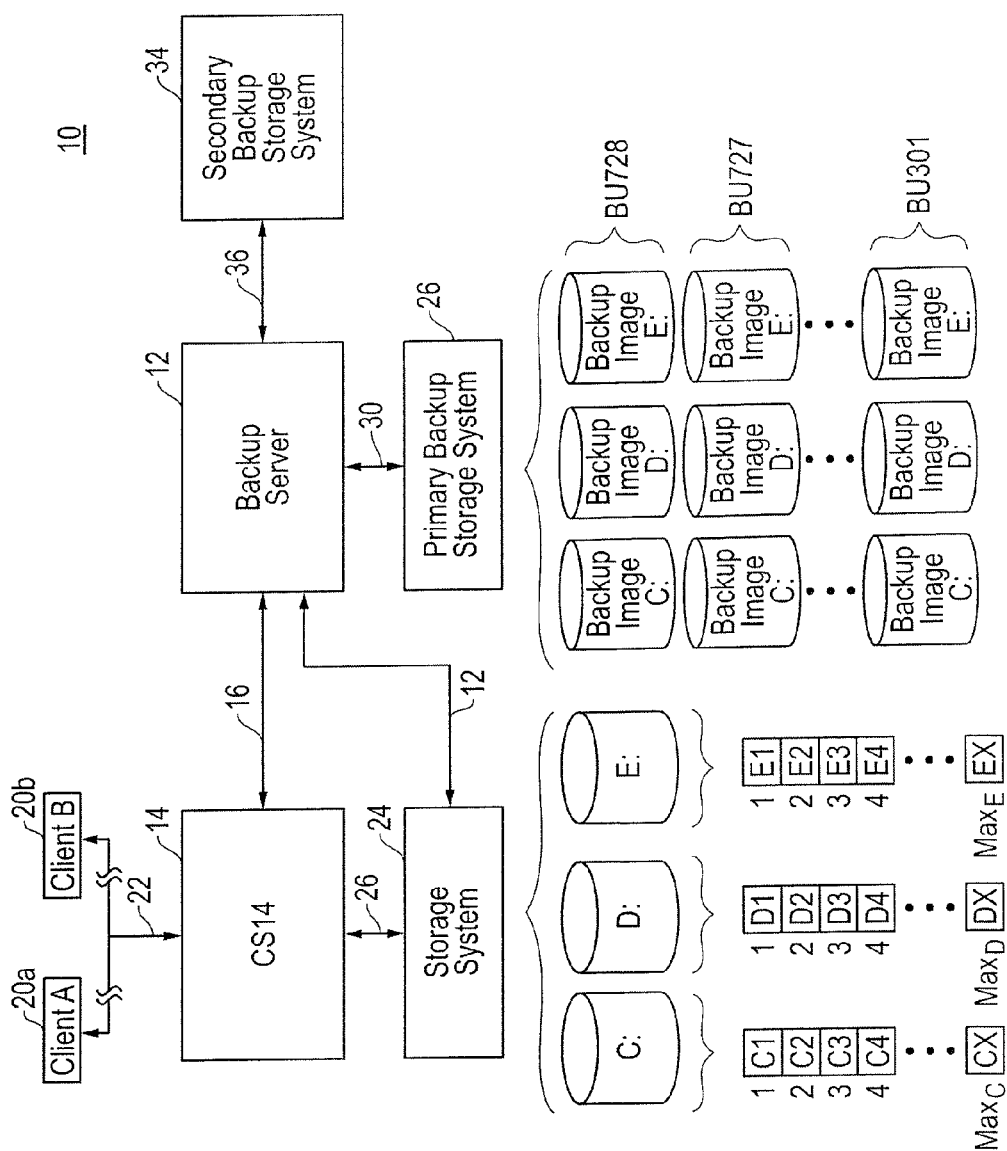
FIG. 1 illustrates relevant components of an example data processing system.

FIG. 1 illustrates in block diagram forms, relevant components of an example data processing system 10. The present invention will be described with reference to data processing system 10, it being understood that the present invention should not be limited to use therewith. Data processing system 10 includes a backup server 12 coupled to a computer system 14 via a communication link 16. Computer system 14 (hereinafter referred to as CS14) is a server and processes transaction requests it receives from client computer systems 20A and 20B via communication link 22. More particularly, CS14 processes transaction requests it receives in accordance with applications executing on one or more processors. For purposes of explanation only, CS14 will be described as implementing Exchange Server (hereinafter Exchange), which is a popular messaging system and collaborative software system produced by Microsoft Corporation, and SQL Server (hereinafter SQL), which is a relational database management system produced by Microsoft Corporation, it being understood that additional applications may be implemented on CS14.

A data storage system 24 is coupled to CS14 via communication link 26 and configured to store application data, i.e., data that is accessible by applications such as Exchange and SQL that are executing on CS14. Although storage systems may come in different forms, for purposes of explanation only, storage system 24 takes form one or more disk arrays each containing one or more hard disks that store data. In general, communication links such as communication link 26, can take different forms and may include components such as routers, switches, bridges, etc., which facilitate data communication between components such as CS14 and a disk array in data storage system 24.

In addition to executing applications such as Exchange Server and SQL Server, CS14 is presumed to include a file system manager and a volume manager, each of which can take form in instructions executing on one or more of the processors. In general, a file system manager (also referred to as a file system) is a process that an operating system or application (e.g., Exchange or SQL) uses to organize and keep track of files. For example, a hierarchical file system is one that uses directories to organize files into a tree structure. A file is a collection of data or information that has a name, called the filename. Almost all information is stored in a file. There are many different types of files: data files, text files, image files, directory files, and so on. Different types of files store different types of information. A directory on the other hand is an organizational unit, or container, used to organize folders and files into a hierarchical structure. Directories contain bookkeeping information about files that are, figuratively speaking, beneath them in the hierarchy. The files and directories at any level are contained in the directory above them. To access a file, an operating system or application needs to specify a path or the names of all the directories above it. The topmost directory in any file is called the root directory. A directory that is below another directory is called a subdirectory. A directory above a subdirectory is called the parent directory. Under DOS and Windows, the root directory is a back slash (\).

As noted, CS14 implements a volume manager. In general, a volume manager is a process that logically aggregates physical or logical units of data storage provided by a storage system such as storage system 24 into higher levels of storage called volumes. Each volume is seen by the file manager of CS14 as a sequential number of logical data blocks, which are read and write accessible by the file system. While it may be said that data blocks of a volume store data, in reality the data is stored in physical memory blocks of storage media (e.g. hard disks) mapped directly or indirectly thereto. For purposes of explanation only, the volume manager executing on CS14 logically aggregates units of storage provided by storage system 24 into three distinct volumes including volume C:, volume D:, and volume E:.

FIG. 1 illustrates graphical representations of volumes C:, D:, and E:. Volume C: includes $max_C$ data blocks, each of which stores or is capable of storing a quantity of data (e.g., 512 bytes). Volume D: includes $max_D$ data blocks, each of which stores or is capable of storing a quantity of data. Lastly, volume E: includes $max_E$ data blocks, each of which stores or is capable of storing data. For purposes of explanation only, volumes C: and E: store application data in files for Exchange, while volume D: stores application data in files for SQL, including SQL Database "BEDB" and SQL Database "System." Lastly, volume C: is presumed to store a directory named "Documents and Settings" that store Word documents and PowerPoint presentations. It is noted that volumes C:, D:, and E: may store additional data in files.

Data stored on memory media such as the hard disks of storage system 24 are subject to loss as a result of hardware failure, software error, or human error. Data loss events in the past motivated the creation of backup and restore systems. Backup refers to a process of making backup copies of data (e.g., volumes C:, D:, and E: on storage system 24) that may be subsequently used to restore data after a data loss event. Backup copies are useful primarily for two purposes. The first is to restore all data (e.g., all data in volumes C:. D:, and E:) to a state that existed before a disaster (called disaster recovery). The second is to restore small numbers of files after they have been accidentally deleted or corrupted.

Although not shown in FIG. 1, backup server 12 includes a server backup/restore module in the form of instructions executing on one or more processors, and CS14 includes a client backup/restore module in the form of instructions executing on one or more processors. The server and client backup/restore module implement a primary backup process to create primary backup copies of data stored on storage system 24. There are many different ways of creating primary backups of data. In one embodiment, primary backups may be created on the file system level by copying data in a file-by-file process until all files are copied to primary backup storage system 26. Alternatively, primary backups may be created on the volume level by copying data in a volume block-by-block process until all volumes are copied to primary backup storage system 26. The file system is essentially ignored in this alternative, volume level backup process. For purposes of explanation only, the server and client backup/restore modules of backup server 12 and CS14, respectively, implement a primary backup process to create primary backups of volumes C:, D:, and E: using the volume level block-by-block process that ignores the file system, it being understood that the present invention should not be limited thereto. The primary backup copies are stored on primary backup storage system 26 and referred to as backup images of volumes C:, D:, and E:. A backup image is a single file containing the complete contents and structure representing a volume (e.g., volume C:, D:, or E:).

Volumes C:, D:, and E: are backed up on a periodic basis (e.g., nightly at 1:00 am) as scheduled by a system administrator. Primary backup images of volumes C:, D:, and E: are stored in primary backup storage system 26 until released. FIG. 1 illustrates graphical representations of several primary backup images of volumes C:, D:, and E:. The backup images of volumes C:, D:, and E:, once created, may be contained within respective files for subsequent access during a secondary backup process more fully described below. Thus, primary backup images of volumes C:, D:, and E: that were created on day March $1^{st}$ are stored in a file designated BU301, the primary backup images of volumes C:, D:, and E: that were created on July $27^{th}$ are stored within a file designated BU727, and the most recently created primary backup images of volumes C:, D:, and E: are stored in a folder designated BU728 (see FIG. 1).

As noted above, the primary backup images of volumes C:, D:, and E: are retained in backup storage system 26 for a predetermined amount of time at which point they are released as no longer needed. However, different data stored within the primary backup images may have different value to users and would benefit from the ability to have different retention periods. Backup server 12, in one embodiment, can implement a secondary backup process on one or more processors for creating secondary backup copies of data contained in the primary backup images of volumes C:, D:, and E:. These secondary backup copies can be stored within secondary backup storage system 34, which is coupled to backup server 12 via communication link 36. In one embodiment, secondary backup storage system 34 include several storage media (e.g., magnetic tapes) in which secondary backup copies are stored, it being understood that the secondary backup storage system 34 need not be limited thereto.

Figure 2:
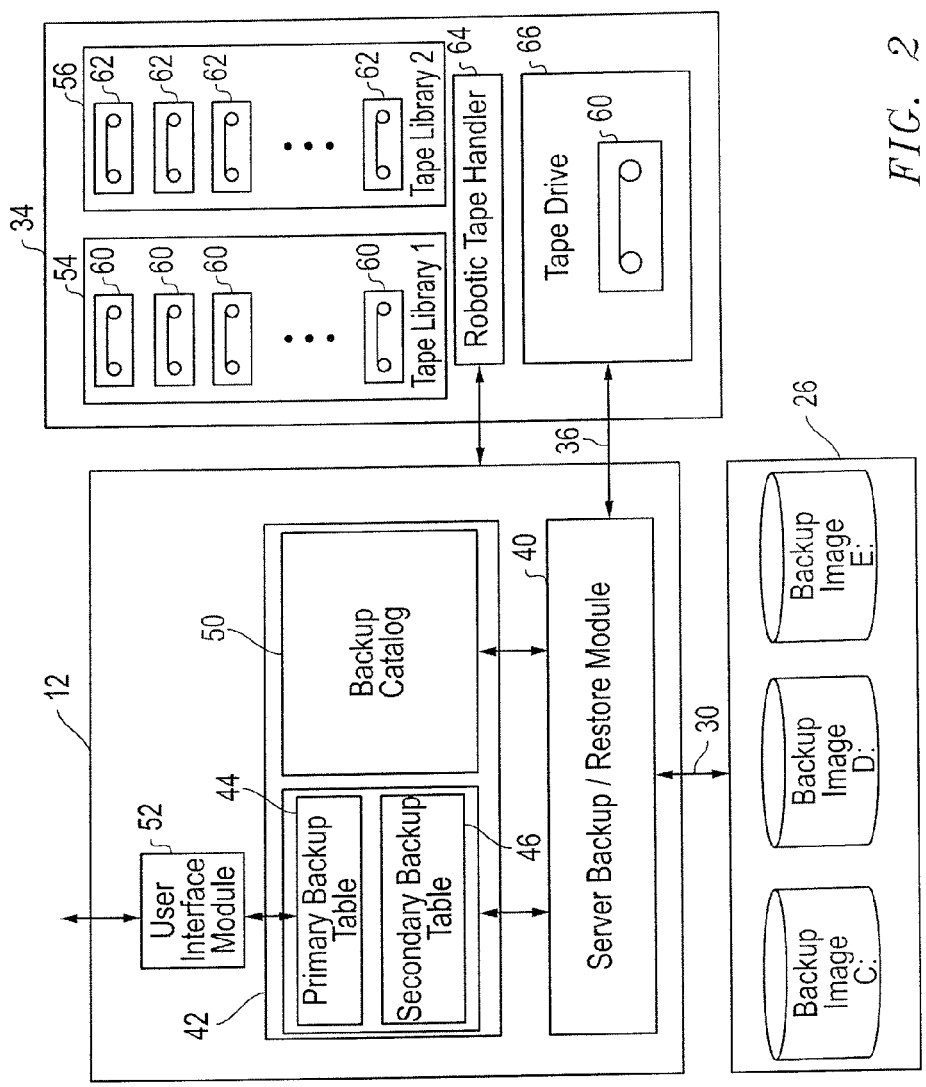
FIG. 2 illustrates relevant components of the example backup server and the secondary backup storage of the data processing system of FIG. 1.

FIG. 2 is a block diagram illustrating relevant components of an example backup server 12 and an example secondary backup storage system 34. As shown, backup server 12 includes server backup/restore module 40 in data communication with primary backup storage system 26 and secondary backup storage system 34 via communication links 30 and 36, respectively. Backup/restore module 40 may take form in one or more instructions executing on one or more processors of server 12. Backup/restore module 40 is in data communication with memory 42, which stores a primary backup table 44, a secondary backup table 46, and a backup catalog 50. Primary backup table 44 and secondary backup table 46 are also in data communication with a user interface module 52, which takes form in instructions executing on one or more processors of backup server 12. Although not shown in FIG. 2, each of primary and secondary backup tables contains one or more entries, and each entry includes backup process parameters that are modifiable by a system administrator via user interface module 52. Additionally, the system administrator can add or delete entries within either primary backup table 44 or secondary backup table 46 as needed.

Primary backup table 44 includes at least one entry that includes a schedule for creating primary backup images of volumes (e.g., volumes C:, D:, and E:). Secondary backup table 46 includes one or more entries, each of which includes a schedule for creating secondary backup of data contained within the most recently created primary backup images of volumes C:, D:, and E:. Backup catalog 50 contains multiple entries, each one of which identifies either a file that stores primary backup images of volumes C:, D:, and E:, or one or more data objects within secondary backup storage system 34 that store secondary backup copies of data of one or more of the primary backup images of volumes C:, D:, and E:. Each entry within backup catalog 50 may also include information for defining a retention period for a backup copy (either primary backup images of volumes C:, D:, and E:, or secondary backup copies of data).

The secondary backup system 34 shown in FIG. 2 includes at least a pair of tape libraries 54 and 56 that contain a plurality of magnetic tapes 60 and 62, each of which stores or is configured to store a secondary backup copy. Secondary data storage system 34 also includes a robotic tape handler 64 and a tape drive 66 into which robotic tape handler 64 can insert or retrieve a tape 60 or 62 from library 54 or 56, respectively. After robotic handler 64 inserts one of the magnetic tapes 60 or 62 into tape drive 66 in accordance with an instruction from backup server 12, backup/restore module 40 may read data from one or more of the most recently created backup images C:, D:, and E: for subsequent transfer and storage on the inserted tape 60 or 62, thereby creating a secondary backup copy.

FIG. 3 illustrates a graphical representation of an example primary backup table 44 shown within FIG. 2. In the embodiment shown, primary backup table 44 contains one entry, which is modifiable by a system administrator via user interface module 52 (see FIG. 2). In general the entry of primary backup table 44 should include one or more identifiers of one or more volumes on storage system 24, a schedule for creating the primary backup images of the volumes identified in the entry, and a retention period for the primary backup images. In the example shown, "//CS 14/*" identifies volumes C:, D:, and E: on storage system 24 since //CS 14, which is a directory name, identifies data accessible by all applications of CS 14. The entry also indicates that primary backup images of volumes C:, D:, and E: should be created daily at 1:00 am. Lastly, the entry indicates that the primary backup images, once created, should be retained for four weeks. In accordance with the entry shown in FIG. 3, the primary backup process occurs daily starting at 1:00 a.m., and copies data in volumes C:, D:, and E: in a block-by-block fashion to primary backup storage system 26, thereby created primary backup images of volumes C:, D:, and E:. A filename (e.g., BU728) is created for a file that stores the just created primary backup images of volumes C:, D:, and E:.

FIG. 4 shows a graphical representation of an example secondary backup table 46. Secondary backup table 46 includes three entries. In general, each entry in a secondary table should include an identity of data in the most recently created primary backup copies of volumes, a schedule for creating secondary backup copies of the identified data, an identity of the tape library where the secondary backup copies should be stored, and a retention period for the secondary backup copies. In the illustrated example, entry 1 of the secondary backup table 46 indicates data identified by \\CS14\Exchange\* (i.e., data accessible by the Exchange application executing on CS14) should be copied every Monday beginning at 2:00 a.m. from the most recently created primary backup images of volumes C: and E:, to tape library 1 (e.g., tape library 54). This entry also indicates that once copied, the data should be retained for a period of seven years. Entry 2 indicates that data of SQL database BEDB, which is identified as \\CS14\SQL\BackupExec\BEDB, should be copied every Sunday beginning at 2:00 a.m. from the most recently created primary backup image of volume D:, to tape library 2 (e.g., tape library 56), and should be retained for a period of one year. Lastly, entry 3 indicates that all Word documents and all PowerPoint presentations, should be copied every daily beginning at 3:00 a.m. from the DocumentsAndSettings folder of the most recently created primary backup image of volume C:, to tape library 1, and retained there for a period of six months.

Figure 5:
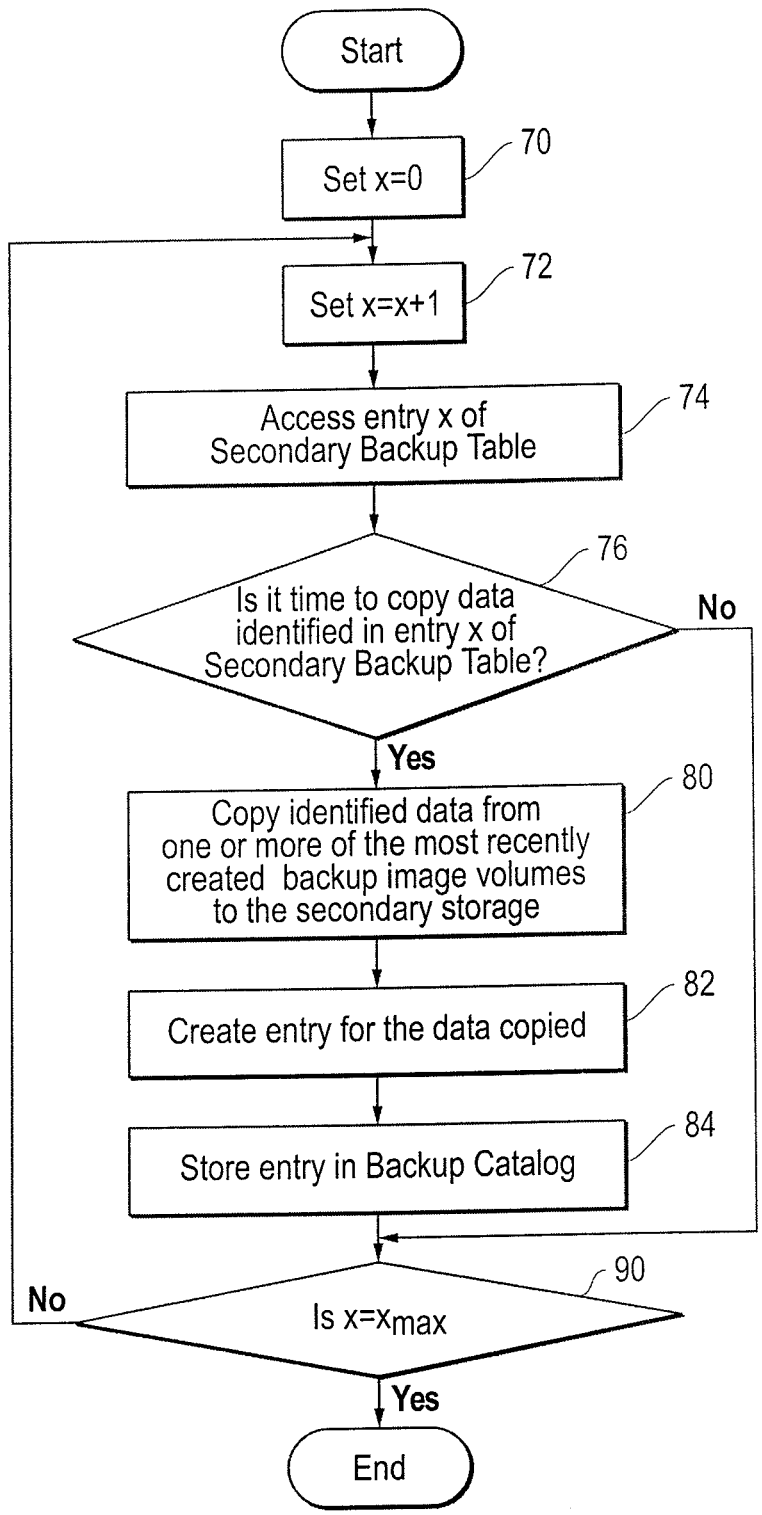
FIG. 5 illustrates relevant aspects of an example process for creating secondary backup copies.

As noted above, backup/restore module 40 of backup server 12 creates primary backup images of volumes C:, D:, and E: in accordance with the primary backup table 44 shown in FIG. 3. This backup process occurs daily at 1:00 a.m. in accordance with the schedule set forth in the primary backup table 44. Upon completion, backup/restore module 40 initiates a secondary backup process. FIG. 5 illustrates relevant aspects of one embodiment of the secondary backup process. As shown in FIG. 5, the process begins with backup/restore module setting a dummy variable x to 0 and subsequently incrementing variable x by 1 in step 72. In step 74, backup/restore module 40 accesses entry x of the secondary copy table to read the schedule therein. Thereafter, in step 76, backup/restore module 40 determines whether it is time to copy data identified in the entry x based upon the current time and the time of the schedule set forth in entry x. If it is not time to copy, the process proceeds to step 90 where x is compared with $x_{max}$, the total number of entries in secondary backup table 46. If x does not equal $x_{max}$, the process returns to step 72 where x is incremented by 1. If, however, the entry x's schedule dictates that it is time to copy data identified in entry x, then the process proceeds to step 80 where backup/restore module 40 copies the identified data from one or more of the most recently created primary image backups of volumes C:, D:, or E: to the secondary storage that is also identified within entry x. For example, if it is 2:00 a.m. Sunday morning when the process shown in FIG. 5 is being implemented, then backup/restore module 40 will copy the contents of BEDB, which is identified by //CS 14/SQL/BackupExec/BEDB, to a tape of library 2. One of ordinary skill in the art will understand that backup/restore module 40 has knowledge of the file structure of backup images of volumes C:, D:, and E: to enable the access and reading of select data such as //CS14/SQL/BackupExec/BEDB.

Backup/restore module 40 creates a catalog entry within backup catalog 50 for the data copied in step 80. FIG. 6 illustrates in graphical form one embodiment of catalog 50. Each entry within catalog 50 includes (1) a timestamp when the corresponding primary backup images was created or when the corresponding secondary backup copy was created, (2) the retention period for retaining the primary backup images or secondary backup copy, (3) a location where the primary backup images or secondary backup copy can be found, along with (4) an identity of the data that was copied. The most recently created entry (i.e., entry 1507) in catalog table 50 indicates that primary backup images of volumes C:, D:, and E:, identified by //CS14/*, was created at 1:00 a.m. on July 28$^{th}$ and stored within the B2B folder as file BU728 (see FIGS. 1 and 2). The most recent entry also indicates the retention period of four weeks for this primary backup copy.

Figure 7:
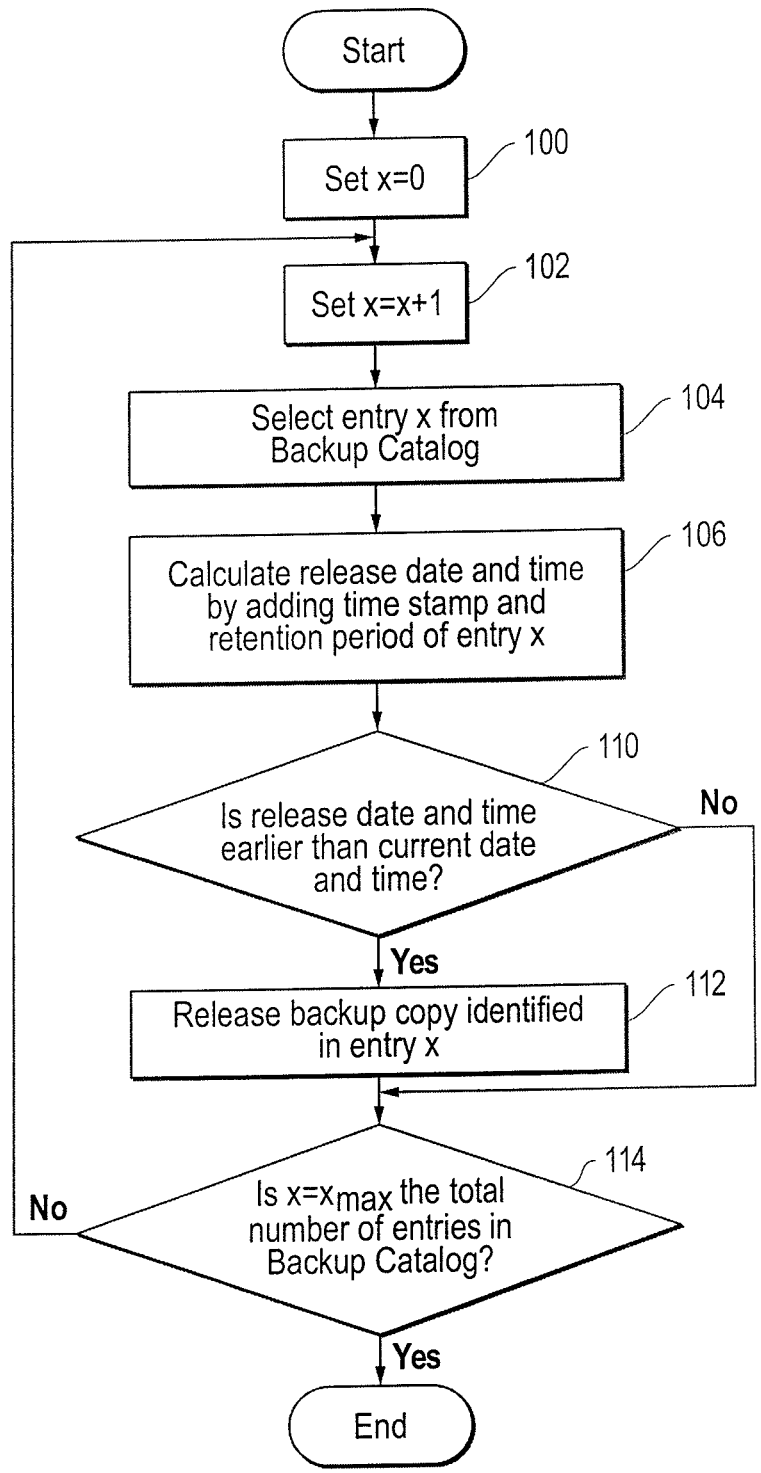
FIG. 7 illustrates relevant aspects of an example process for reviewing the backup catalog shown in FIG. 6.
Figure 8:
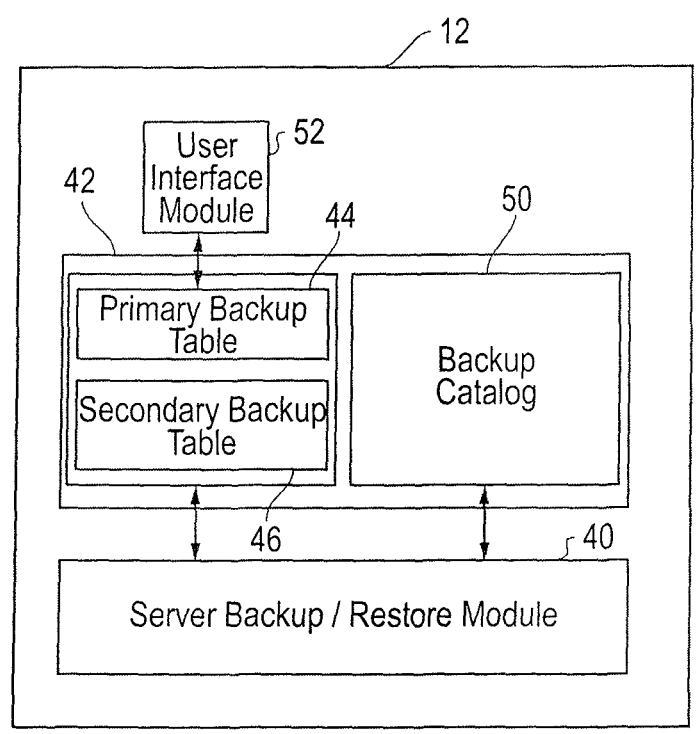
FIG. 8 illustrates a system employing one embodiment of the present invention.
Figure 9:
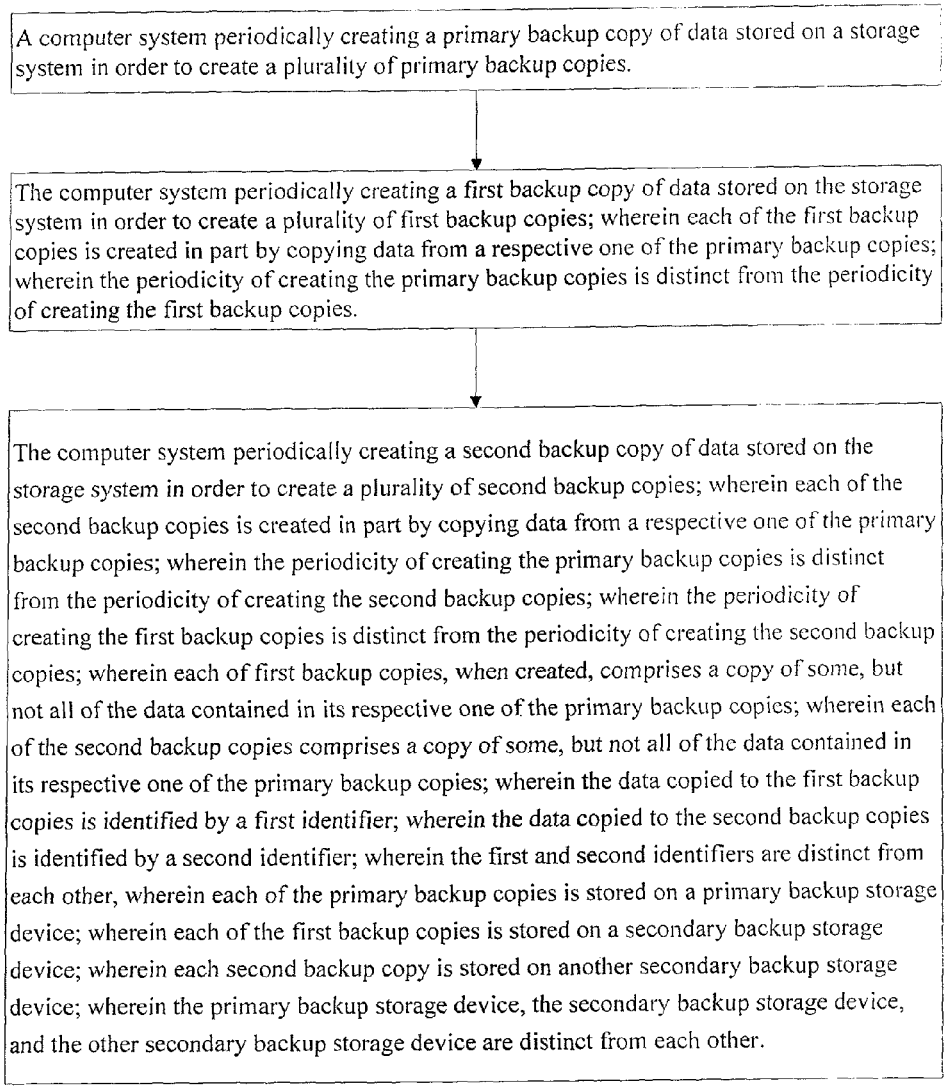
FIG. 9 illustrates relevant aspects of an example process implemented by a computer in accordance with one embodiment of the present invention.

Returning to the process shown in FIG. 5, once each entry within secondary backup table has been processed, backup/restore module 40 initiates a backup catalog review process to identify primary backup image files or secondary backup copies to be released. FIG. 7 is a flow chart illustrating relevant aspects of one embodiment of the catalog review routine. Again, this routine or process is performed by the backup/restore module 40. In steps 100 and 102, backup/restore module 40 sets variable x to 0 and increments variable x by 1. Thereafter, in step 104 backup/restore module 40 selects entry x from the backup catalog and reads the contents thereof. In step 106, backup/restore module 40 calculates a release date and time by adding the timestamp and retention period of entry x. For example, with continuing reference to FIGS. 6 and 7, backup/restore module 40, in accordance with step 106, will access entry 1505 and add a four week time period (i.e., the retention period of entry 1505) to the timestamp of Jul. 27, 2008, 1:00 a.m., to calculate a release date and time. If the current date and time is the same as or later than the release time and date calculated in step 106, then as shown in step 112, the backup copy identified within entry x is deleted or released. Otherwise, the backup copy identified within backup table 50 is not deleted or released, and the process proceeds to step 114 whereby backup/restore module 40 compares the current value of x to $x_{cat}$, the total number of entries in the backup catalog 50. If these two values are not equal, steps 102-112 are repeated. Eventually, the process shown in FIG. 7 ends when x equals $X_{cat}$.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM. Additionally, it should be understood that embodiments of the present invention are not limited to a particular type of data processing or computer system. Rather, embodiments of the present invention may be implemented in a wide variety of data processing systems (e.g., host computer systems, network switches, network appliances, and/or disk arrays).

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   periodically creating a primary backup copy of data stored on a storage system in order to create a plurality of concurrently existing, primary backup copies; and
   periodically creating a first backup copy of data stored on the storage system in order to create a plurality of first backup copies, wherein each of the first backup copies is created in part by selectively copying some, but not all of the data from a respective one of the primary backup copies, wherein
the selectively copying the some, but not all of the data is based, at least in part, on a predetermined retention period associated with the some, but not all of the data, wherein
the predetermined retention period of the some, but not all of the data is distinct from a different retention period associated with other data in the primary backup copy;
wherein a first periodicity of creating the primary backup copies is once and only once each day; and
wherein a second periodicity of creating the first backup copies is once and only once each week.

2. The method of claim 1 further comprising:
periodically creating a second backup copy in order to create a plurality of second backup copies, wherein each of the second backup copies is created in part by selectively copying second data from a respective one of the primary backup copies;
wherein the first periodicity of creating the primary backup copies is distinct from the second periodicity of creating the second backup copies.

3. The method of claim 2 further comprising:
retaining each of the primary backup copies for a period of time from creation thereof;
retaining each of the first backup copies for a first period of time from creation thereof;
retaining each of the second backup copies for a second period of time from creation thereof;
wherein the period of time, the first period of time, and the second period of time are distinct from each other.

4. The method of claim 2 wherein each of the second backup copies comprises a copy of some, but not all of the data contained in its respective one of the primary backup copies.

5. The method of claim 4:
wherein the data copied to the first backup copies is identified by a first identifier;
wherein the data copied to the second backup copies is identified by a second identifier;
wherein the first and second identifiers are distinct from each other.

6. The method of claim 5:
wherein each of the primary backup copies is stored on a primary backup storage device;
wherein each of the first backup copies is stored on a secondary backup storage device;
wherein each second backup copy is stored on an other secondary backup storage device;
wherein the primary backup storage device, the secondary backup storage device, and the other secondary backup storage device are distinct from each other.

7. The method of claim 5:
wherein the first identifier identifies first application data accessible by a first application;
wherein the second identifier identifies second application data accessible by a second application;
wherein the first and second applications are distinct from each other.

8. The method of claim 5:
wherein the first identifier identifies first application data accessible by a first application;
wherein the second identifier comprises a file system path name that identifies a file in a file system.

9. The method of claim 5:
wherein the first identifier comprises a first file system path name that identifies a first folder;
wherein the second identifier comprises a second file system path name that identifies a second folder;
wherein the first and second file system path names are distinct from each other.

10. The method of claim 2, wherein
the selectively copying the second data is based on a second identifier, and
the second identifier identifies a second type of data from the data of the respective one of the primary backup copies.

11. The method of claim 10, wherein
the selectively copying some, but not all of the data is based on a first identifier,
the first identifier identifies a first type of data out of the data from the respective one of the primary backup copies, and
the first type of data is distinct from the second type of data.

12. The method of claim 1 further comprising:
retaining each of the primary backup copies for a period of time from creation thereof;
retaining each of the first backup copies for a first period of time from creation thereof;
wherein the period of time, and the first period of time are distinct from each other.

13. The method of claim 1, wherein
the each of the primary backup copies are retained for respective primary periods of time,
the each of the first backup copies are retained for respective first periods of time, and
at least some of the respective primary periods of time are different from the respective first periods of time.

14. The method of claim 1, wherein
the selectively copying some, but not all of the data is based on a first identifier, and
the first identifier identifies a first type of data out of the data from the respective one of the primary backup copies.

15. A computer readable medium comprising instructions executable by a computer system, wherein the computer system implements a method in response to executing the instructions, the method comprising:
periodically creating a primary backup copy of data stored on a storage system in order to create a plurality of concurrently existing, primary backup copies; and
periodically creating a first backup copy of data stored on the storage system in order to create a plurality of first backup copies, wherein
each of the first backup copies is created in part by selectively copying some, but not all of the data from a respective one of the primary backup copies,
wherein the selectively copying the some, but not all of the data is based, at least in part, on a predetermined retention period associated with the some, but not all of the data, wherein
the predetermined retention period of the some, but not all of the data is distinct from a different retention period associated with other data in the primary backup copy;
wherein a first periodicity of creating the primary backup copies is once and only once each day; and
wherein a second periodicity of creating the first backup copies is once and only once each week.

16. The computer readable medium of claim 15 wherein the method further comprises:

periodically creating a second backup copy of data stored on the storage system in order to create a plurality of second backup copies, wherein each of the second backup copies is created in part by selectively copying data from a respective one of the primary backup copies;

wherein the first periodicity of creating the primary backup copies is distinct from the second periodicity of creating the second backup copies.

17. The computer readable medium of claim 16 wherein each of the second backup copies comprises a copy of some, but not all of the data contained in its respective one of the primary backup copies.

18. The computer readable medium of claim 16:
wherein the data copied to the first backup copies is identified by a first identifier;
wherein the data copied to the second backup copies is identified by a second identifier;
wherein the first and second identifiers are distinct from each other.

19. The computer readable medium of claim 18:
wherein the first identifier identifies first application data accessible by a first application;
wherein the second identifier identifies second application data accessible by a second application;
wherein the first and second applications are distinct from each other.

20. The computer readable medium of claim 18:
wherein the first identifier identifies first application data accessible by a first application;
wherein the second identifier comprises a file system path name that identifies a file in a file system.

21. The computer readable medium of claim 18:
wherein the first identifier comprises a first file system path name that identifies a first folder;
wherein the second identifier comprises a second file system path name that identifies a second folder;
wherein the first and second file system path names are distinct from each other.

22. The computer readable medium of claim 16 wherein the method further comprises:
releasing each of the primary backup copies after a period of time from creation thereof;
releasing each of the first backup copies after a first period of time from creation thereof;
releasing each of the second backup copies after a second period of time from creation thereof;
wherein the period of time, the first period of time, and the second period of time are distinct from each other.

23. The computer readable medium of claim 16 wherein the method further comprises:
accessing first and second entries of a data object in a memory each time a primary backup copy is created;
wherein the first entry comprises the first periodicity of creating the first backup copies;
wherein the second entry comprises the second periodicity of creating the second backup copies.

24. An apparatus comprising:
a storage system for storing data;
a primary backup storage system for storing a plurality of primary backup copies of data stored on the storage system;
a secondary backup storage system for storing a plurality of secondary backup copies of data stored on the primary backup storage system;
a computer system configured
to periodically create a primary backup copy of data stored on the storage system in order to create the plurality of concurrently existing, primary backup copies, and
to periodically create a secondary backup copy of data stored on the primary backup storage system in order to create the plurality of secondary backup copies, wherein
each secondary backup copy is created by the computer system by selectively copying some, but not all of the data from a respective one of the primary backup copies, wherein
the selectively copying the some, but not all of the data is based, at least in part, on a predetermined retention period associated with the some, but not all of the data, wherein
the predetermined retention period of the some, but not all of the data, is distinct from a different retention period associated with other data in the primary backup copy;
wherein a first periodicity of creating the primary backup copies is once and only once each day; and
wherein a second periodicity of creating the first backup copies is once and only once each week.

* * * * *

UNITED STATES PATENT AND TRADEMARK OFFICE
CERTIFICATE OF CORRECTION

PATENT NO. : 9,176,825 B2
APPLICATION NO. : 12/347577
DATED : November 3, 2015
INVENTOR(S) : Tsaur et al.

It is certified that error appears in the above-identified patent and that said Letters Patent is hereby corrected as shown below:

In the Claims

Column 12
Line 44, in Claim 24, replace: "first backup" by -- secondary backup --

Signed and Sealed this
Thirty-first Day of May, 2016

Michelle K. Lee
*Director of the United States Patent and Trademark Office*